Feb. 3, 1970
F. ALBERT
3,493,296
LOW SILHOUETTE VIEWING DEVICE
Filed Sept. 27, 1967
4 Sheets-Sheet 1
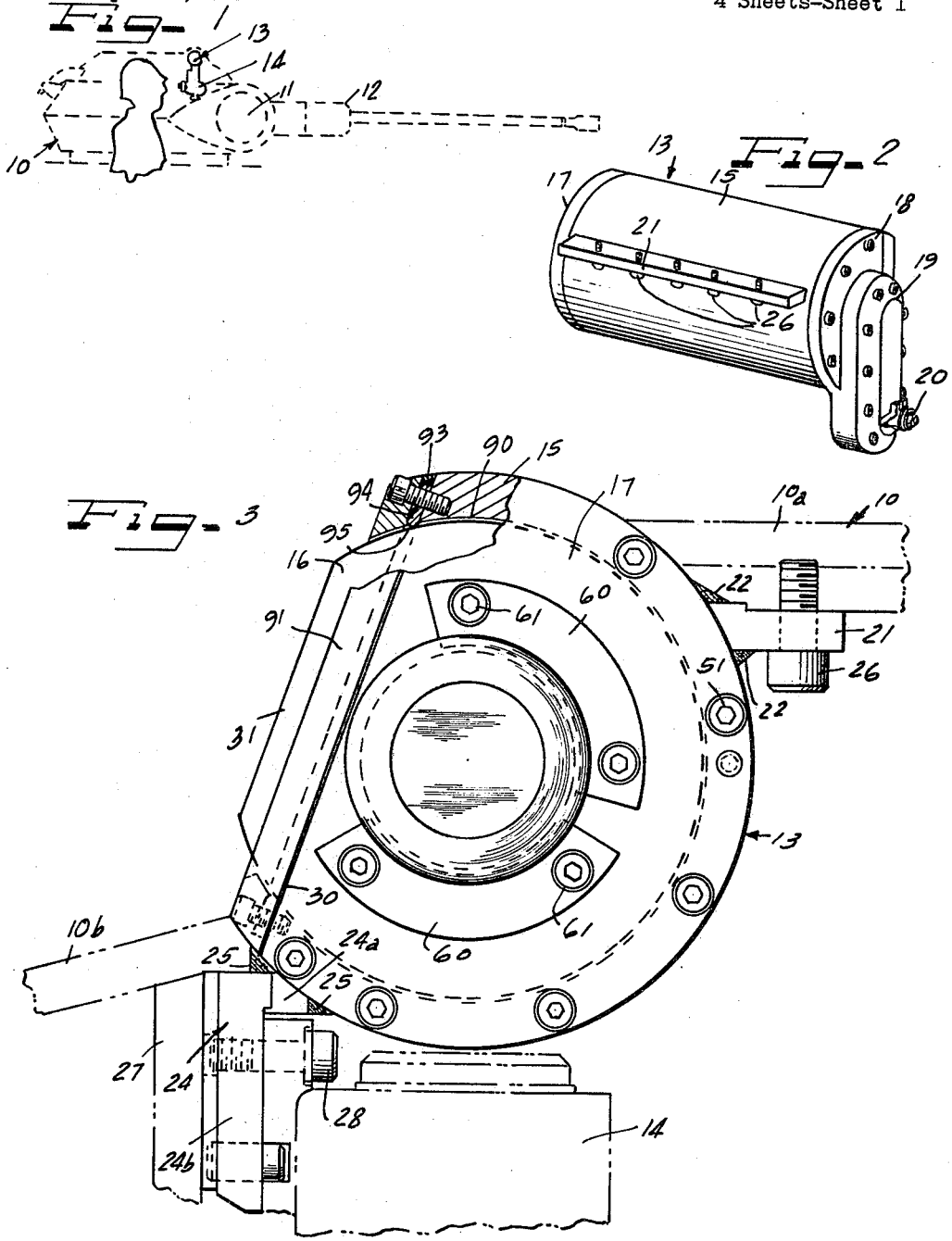
INVENTOR.
FRANK ALBERT
BY ATTORNEYS

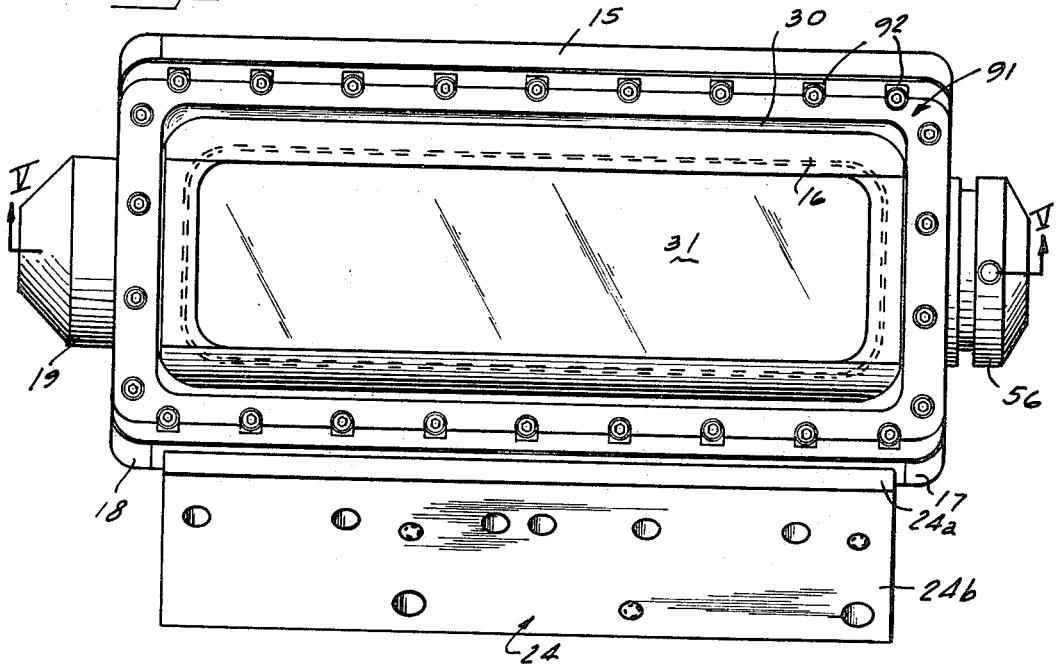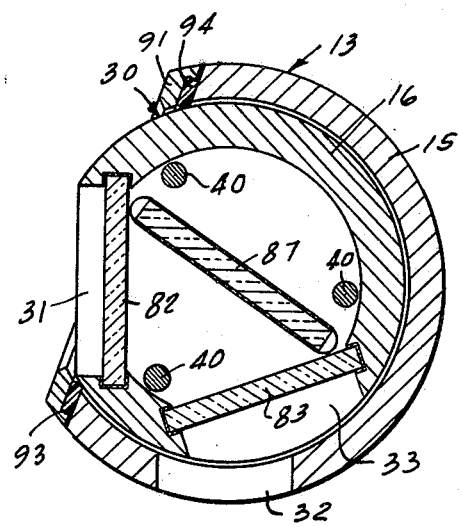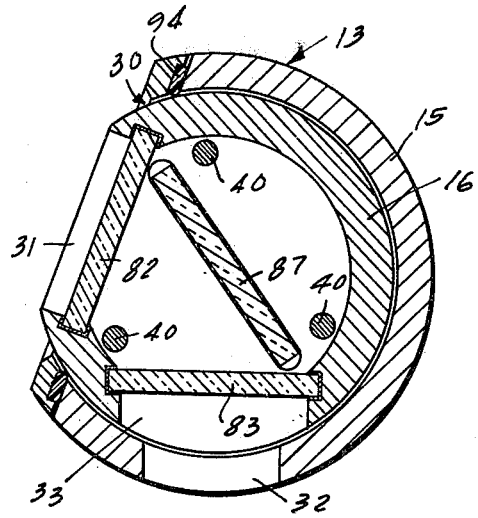

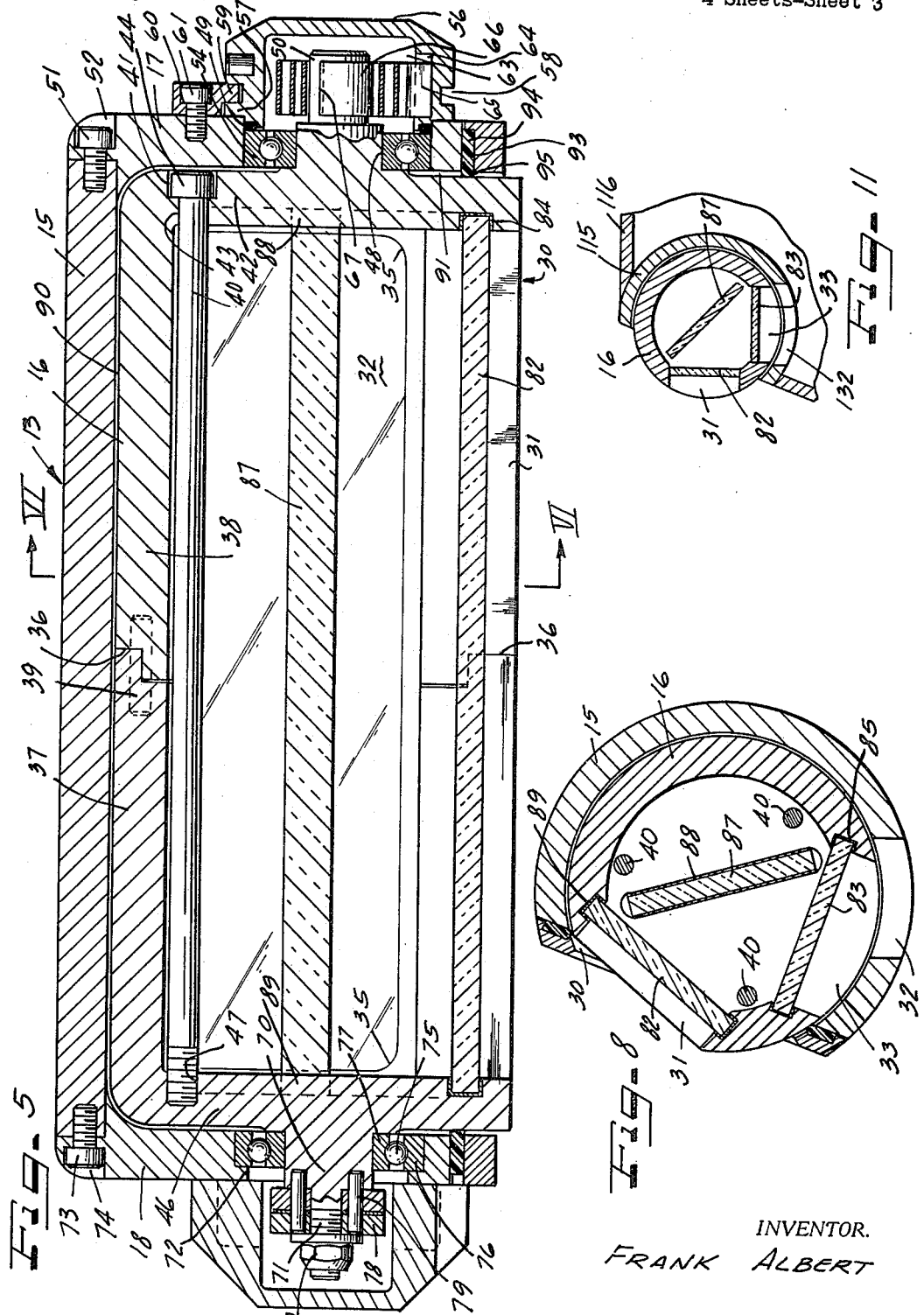

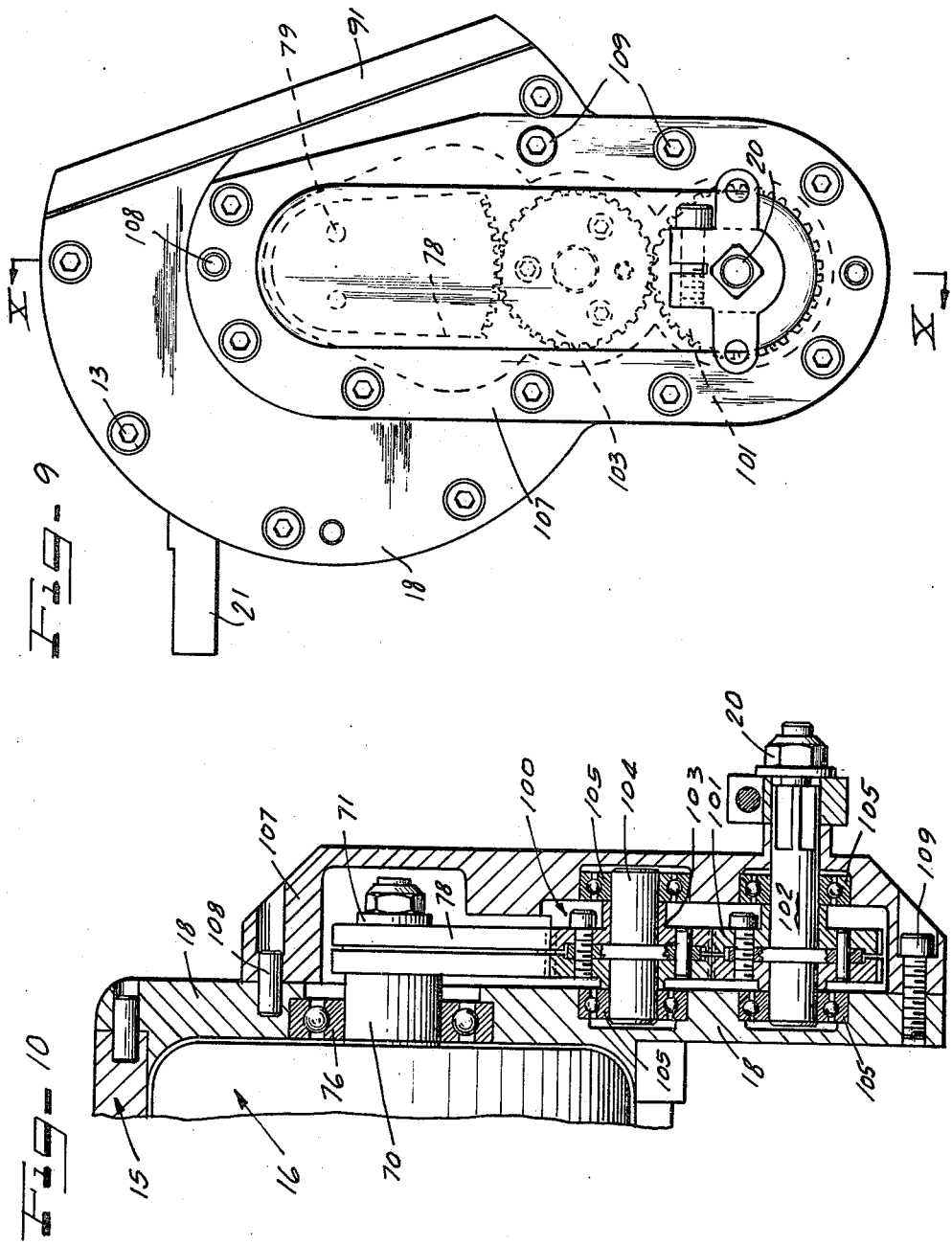

United States Patent Office 3,493,296
Patented Feb. 3, 1970

3,493,296
LOW SILHOUETTE VIEWING DEVICE
Frank Albert, Parma, Ohio, assignor to TRW Inc.,
Cleveland, Ohio, a corporation of Ohio
Filed Sept. 27, 1967, Ser. No. 670,892
Int. Cl. G02b 5/08, 7/18
U.S. Cl. 350—302    11 Claims

ABSTRACT OF THE DISCLOSURE

A low silhouette device mirror device mounting for vehicles useful with an independent sighting mechanism and having two nested longitudinal cylinders each of which has two view slots therethrough spaced apart approximately 90°, the slots in the inner cylinder normally align with the slots in the outer cylinder and one set of slots opens to the interior of the vehicle while the other set opens to the exterior of the vehicle. The inner cylinder has an angled image reflecting mirror therein and the inner cylinder has an angled image reflecting mirror therein and the inner cylinder is rotatable in the outer cylinder to change the viewing horizon or angle. Linkage between the rotatable inner cylinder and an elevatable weapon allows the mounting to function as a gun sight.

BACKGROUND OF THE INVENTION

Field of the invention

This invention relates to a compact optical device and more particularly to an inconspicuous protected mirror mounting for use with sight mechanisms in the turret of an armored vehicle, or the like.

Prior art

Viewing systems for vehicles which utilize reflecting mirrors are known to the art. Such prior art devices have usually required conspicuous easily damaged projecting portions which extend above the body of the vehicle. This has been especially true in those instances where the field of view could be changed independently of vehicle body movement. In gun associated viewing systems for use in connection with turreted vehicles such as tanks and the like, it is not necessary that the viewing system be able to traverse laterally independently of the turret inasmuch as the turret mounted weapon is usually unable to traverse laterally independent of the turret. However it is desirable that the viewing system be able to traverse vertically independent of the turret which in most instances is unable to traverse vertically.

This requirement of vertical traverse within the viewing system has, in the prior art devices, increased the necessity for easily detected projections above the vehicle. Such projections increased the susceptibility of the viewing system to damage from low hanging obstacles, gun fire, ballistic projectiles and explosions.

Further in prior art viewing systems specifically designed for use in sighting weapons, the sight mechanism has been built in as a part of the total viewing apparatus. This increased the possibility of danger to the expensive optical mechanism of the sight when the projecting portion of the viewing mechanism was damaged.

Another deficiency in prior art sighting mechanisms arises from the fact that in those prior art sighting mechanisms which utilize relatively tiltable mirrors to alter the field of view, the light was required to pass through a stationary or fixed protective glass plate prior to reaching the mirror. As the mirror was tilted relative to the fixed glass, visual distortion could occur.

SUMMARY

These deficiencies in the prior art are overcome by the present invention which provides a mirror mounting which is independent of the optical sight.

The mirror mounting consists of two nested elongated horizontal cylinders. Each of the cylinders has two longitudinal viewing slots therethrough. The slots are cut through the cylinder wall in approximate right angle relationship to each other. The outer cylinder, in a preferred embodiment extends partially through the vehicle body with one viewing slot external of the vehicle body and the other viewing slot internal of the vehicle body. The inner cylinder is rotatable in the outer cylinder and contains a reflecting mirror extending longitudinally therein. The mirror is angled with respect to the viewing slots to reflect light between the viewing slots.

The viewing slots in the interior cylinder are closed by glass panes mounted as a part of the inside cylinder and rotatable therewith. The viewing slots in the inner and outer cylinders are normally aligned with each other. The viewing slot in the outer cylinder which opens to the exterior of the vehicle is larger than the viewing slot on the inner cylinder normally aligned with it. Due to the angle of the mirror in the interior cylinder light entering the viewing slots from outside of the vehicle is reflected by the mirror through the viewing slots to the interior of the vehicle. By rotating the interior cylinder the vertical elevation or horizon of the view is changed. Since rotation of the interior cylinder to rotate the mirror results in rotation of the glass window panes for the viewing slots in the interior cylinder, no optical distortion results.

The cylinders have a diameter smaller than their axial length and since only a portion of the exterior cylinder protrudes through the vehicle wall, the mirror holder of this invention provides a low silhouette thereby affording protection against damage from overhanging objects and ballistic explosions and projectiles. Further, because of the cylindrical configuration of the holder a projectile entering through the viewing slots from the exterior of vehicle is not likely to be deflected from the back wall of the interior cylinder through the viewing slot to the interior of the vehicle.

In a preferred embodiment the optical sighting mechanism is located below the mirror holder adjacent the viewing slot opening to the interior of the vehicle. The sight is preferably not integrally connected with the cylindrical mirror holder and is thereby protected from damage in the event of damage to the mirror holder. Because the sight is not integrally connected with the mirror holder, various sight mechanisms can be used interchangeably without necessitating removal of the mirror holder from the vehicle body. In a preferred embodiment the mirror holder is provided with mounting brackets allowing it to be bolted to the vehicle body. In this manner removal and replacement is facilitated in the event of damage to the mirror holder.

Through suitable linkage arrangements the mirror holder of this invention can be linked to a vertically traversable weapon for which it is to serve as a gun sight. By such linkage vertical traverse of the weapon will automatically rotate the interior cylinder a desired degree thereby changing the field of vision to correspond with the point of fire of the weapon.

It is then an object of this invention to provide a low silhouette mirror housing containing a relatively tiltable mirror for use with armored vehicles.

It is a further object of this invention to provide a low silhouette mirror housing consisting of two nested longitudinal cylinders having viewing slots therethrough and a relatively tiltable mirror therein reflecting light from one viewing slot to the other.

It is another more specific object of this invention to provide a low silhouette mirror housing consisting of two nestled elongated cylinders with aligned viewing slots therethrough each cylinder having two viewing slots circumferentially spaced from each other and the inner cylinder containing a longitudinal mirror angled with respect to the viewing slots to reflect light from one viewing slot to the other, the inner cylinder being rotatable in the outer cylinder and the outer cylinder adapted to be fitted to the body of an armored vehicle with one viewing slot positioned on the outside of the armored vehicle and the other viewing slot on the inside of the vehicle.

Many other advantages, features and additional objects of the present invention will become manifest to those versed in the art upon making reference to the detailed description in the accompanying sheets of drawings in which a preferred structural embodiment incorporating the principles of the present invention is shown by way of illustrative example.

BRIEF DESCRIPTION OF THE DRAWINGS

FIGURE 1 is a phantom view of an armored vehicle gun turret illustrating the placement of the mirror housing of this invention;

FGURE 2 is a perspective view of the back of the mirror housing of this invention;

FIGURE 3 is an end elevational view of the mirror housing of this invention on a larger scale than FIGURE 2 illustrating a preferred manner of mounting in a vehicle turret or the like;

FIGURE 4 is a front plan view of the mirror housing of this invention;

FIGURE 5 is a longitudinal cross-sectional view of the mirror housing of this invention taken along the lines V—V of FIGURE 4;

FIGURE 6 is a transverse cross-sectional view of mirror housing this invention taken along the lines VI—VI of FIGURE 5 and illustrating the inner cylinder in a depressed viewing position;

FIGURE 7 is a transverse cross sectional view similar to FIGURE 6 but illustrating the inner cylinder in fully open viewing position;

FIGURE 8 is a transverse cross-sectional view similar to FIGURE 6 but illustrating the inner cylinder in an elevated viewing position;

FIGURE 9 is an end elevational view of the linkage portion of the mirror housing of this invention showing the gear train;

FIGURE 10 is a fragmental cross-sectional view taken along the lines X—X of FIGURE 9;

FIGURE 11 is a cross-sectional view of another embodiment of the mirror housing of the invention.

DESCRIPTION OF PREFERRED EMBODIMENTS

In a preferred embodiment, the mirror housing of this invention is designed for use in the gun turret 10 of an armored vehicle illustrated in FIGURE 1. The turret 10 provides a tiltable mounting 11 which mounts a gun 12 which may be depressed or elevated with respect to the turret 10 while the turret is rotatable with respect to the main body of the vehicle. The mirror housing 13 of this embodiment is mounted in the turret 10 with a front portion projecting to the front of the turret in the direction normal to the axis of the weapon 12. A sighting mechanism 14 in the turret 10 is associated with the mirror housing 13.

As shown in FIGURES 2 to 4, the mirror housing 13 is generally cylindrical and consists of an outer housing 15 and an inner housing 16. The housings 15 and 16 are nestled elongated cylinders. The outer housing 15 is closed on one end by an end cap 17 and the other end by an end cap 18. The end cap 18 has a gear train housing 19 associated therewith. A control knob 20 projects from the lower portion of the gear train housing 19 and is adapted to receive the end of a linkage device which may be attached to the weapon 12 or the weapon elevating mechanism in such a manner that when the weapon 12 is elevated the control knob 20 is turned.

The outer housing 15 has a mounting bracket 21 extending lengthwise across the back thereof. The bracket 21 may be attached to the outer housing 15 by means such as welding as indicated at 22. The bracket 21 projects from the outer housing 15 at an angle of 60° from a line tangent the outer housing at the point of attachment. Approximately half way around the outer diameter of the outer housing 15 is a second bracket 24 attached to the housing 15. The bracket 24 is L-shaped having a short base portion 24a and a longer portion 24b. The base portion 24a is attached to the outer housing 15 such as by welding indicated at 25. The portion 24a is attached to the outer housing at an angle 60° from a line tangent to the housing at the point of contact. The portion 24b depends from the portion 24a at a right angle thereto.

The brackets 21, 24 are used to mount the mirror holder 13 to the turret 10 of the vehicle. As illustrated in FIGURE 3, the roof of the turret 10 of the vehicle is contoured having a top portion 10a and a sloping front portion 10b. The portion 10b is below the portion 10a a distance slightly less than the diameter of the mirror housing 13. The bracket 21 is attached to the portion 10a by means such as bolts 26. A mounting frame 27 depends from the portion 10b and the bracket 24 is secured thereto by means such as bolts 28. The mirror housing 13 extends partially outside of the vehicle turret 10 into the gap between the portion 10a and the portion 10b.

The outer housing 15 is a cylindrical open ended tube with a chordal section extending the length of the tube cutaway to form an exterior viewing slot 30. In the embodiment illustrated the chordal length of the portion cutaway is somewhat less than the full diameter of the cylindrical tube so that about one fourth of the full cylinder is cut off.

The inner cylinder 16 is of a diameter to fit within the outer housing 15 and partially project through the exterior viewing slot 30 of the outer housing 15. A chordal portion of the inner housing 16 is also cut away to form an exterior viewing slot 31. When assembled the portion of the inner housing 16 which projects through the viewing slot 30 of the outer housing 15 contains the viewing slot 31. The portion of the full tube cutaway from the inner housing 16 to provide the viewing slot 31 is somewhat less than the portion cut from the tube 15 which forms the viewing slot 30 and the viewing slot 31 is therefore smaller in chordal height than the viewing slot 30.

As is best illustrated in FIGURES 6, 7 and 8 interior viewing slots 32 and 33 similar to the slots 30 and 31 are also formed respectfully through the outer housing 15 and the inner housing 16. The viewing slots 32 and 33 have axial center points spaced approximately 110° from the axial center points of the viewing slots 30 and 31. In the case of the exterior viewing slots 30 and 31 the slot 30 has a greater chordal height than the slot 31, however, in the case of the internal viewing slots 32 and 33 the slot 32 in the external housing 15 has a shorter chordal height than the slot 33 in the interior housing 16. As is shown in FIGURE 7 in normal nestled relationship the longitudinal center lines of the slots 31 and 30 align on the same plane while the longitudinal center lines of the slots 32 and 33 lie in the same planes. Because the inner cylinder 16 is rotatable within the outer housing 15 this conjunction of the center lines can be altered to an angular relationship as is shown in FIGURE 6 and FIGURE 8.

The outer housing 15 being an open ended cylindrical tube with cut out slots has its ends closed by the end caps 17 and 18 and chordal slice which produces viewing slot 30 extends from one end of the outer housing 15 to the other end. However, the viewing slot 32 terminates in spaced relation from the axial ends of the outer housing 15 and has rounded corners 35.

The inner housing 16 is cylindrical and closed at both ends. The inner housing 16 is split at a central portion 36 into two tight mating halves 37 and 38 with respective interfitting pilot and surrounding flange portions forming a tight seal. The two halves 37 and 38 in their assembled position are held together by dowels 39 and three circumferentially spaced axial draw bolts 40. The housing half 38 has countersunk wells 41 on the outside of the end 42 thereof. Bores 43 through the end 42 communicate with the wells 41. The wells 41 receive the heads 44 of the bolts 40 which extend through the bores 43 into the interior of the housing 16. The end 46 of the half 37 of the inner housing 16 contains threaded bores 47 to receive the threaded ends of the bolts 40.

The end 42 of the half 38 of the inner housing 16 has an axial extension or axle 48 thereon at the center thereof. The extension 48 extends through a bore 49 in the end cap 17 of the outer housing 15. The extension 48 is integral with a further slotted extension 50 which has a central spring receiving slot therein.

The end cap 17 is attached to the outer housing 15 by means of bolts 51 received in circumferentially spaced peripheral counterbores 52.

The bore 49 in the end cap 17 receives the ball bearing unit 54, the outer raceway of which snugly engages the wall of the bore 49 and the inner raceway of which snugly engaged the extension 48.

A spring housing cap 56 is fastened to the outside of the end cap 17 axially beyond the bore 49. The spring cap 56 has a flange 57 around the periphery thereof which overlies the end cap 17 adjacent the bore 49. Adjacent the flange 57 is a groove 58 circumferentially around the spring cap 56. The groove 58 provides a slot receiving tongues 59 which are a part of the two arcuate fastening segments 60 (FIGURE 3) which are secured to the end cap 17 by means of bolts 61. In this manner the spring cap 56 is secured to the end cap 17. The interior 63 of the spring cap 56 is hollow. A slot 64 in the inner periphery of the spring cap 56 retains one end 65 of a spirally wound spring 66. The other end 67 of which is received in the slot of the slotted extension 50 of the inner housing 16. Rotation of the cap 56 will wind the spring and the segments 60 can clamp the cap to provide a desired spring load for elimination of backlash in the gear train 100.

The half 37 of the inner housing 16 has an axial extension or axle 70 thereon at the central portion thereof. The extension 70 has a further central axial extension of smaller diameter 71 integral therewith. The extension 70 extends therethrough a bore 72 in the end cap 18 of the outer housing 15. The end cap 18 is secured to the outer housing 15 by means of nuts 73 received in counterbores 74.

A ball bearing unit 75 is received in a bore 72 of the end cap 18. The outer raceway 76 of the unit 75 engages the wall of the bore 72 and the inner raceway 77 of the ball bearing unit 75 engages the extension 70. A gear sector 78 is journalled onto the small diameter extension 71 and retained in place thereon by dowels 79 and a nut and washer 80 threaded onto the end of the extension 71.

Rotation of the inner housing 16 is accomplished by movement of the gear sector 78 which rotates the extension 71 thereby causing the inner housing 16 to rotate. The spring 66 received in the slotted extension 50 on the other end of the inner housing 16 restrains the housing from rotation independent of rotation initiated by movement of the bear sector 78.

As is best shown in FIGURES 6, 7 and 8 the slots in the inner housing 16 are sealed by glass panes 82 and 83 extending the axial length of the viewing slots 31 and 33 which themselves extend the axial length of the inner housing 16 from the end 42 to the end 46 thereof. The glass panes 82 and 83 are received in grooves 84 and 85 in the wall of the inner housing 16 around the periphery of the viewing slots 31 and 33. The glass panes 82 and 83 may be secured therein by means of cement or the like.

In this manner the inner housing 16 is effectively sealed from the atmosphere and may be filled with a dry inert gas. The provision of a dry inert gas effectively prevents the glass panes 82 and 83 form becoming fogged due to atmospheric conditions.

A mirror 87 extends the axial length of the inner housing and is retained therein by grooves 88 and 89 in the ends 42 and 46 of the inner housing 16. The mirror 87 is angled with respect to the viewing slots 31 and 33 so that light entering the viewing slot 31 is reflected by the mirror 87 to emerge through the viewing slot 33 and vice versa.

In this manner the mirror housing 15 functions as a viewing mechanism reflecting the light from the outside of the vehicle turret 10 which enters through the exterior viewing slots 30 and 31 to exit to the interior of the turret vehicle through the viewing slots 32 and 33. The viewing angle can be changed by rotation of the inner housing 16 with respect to the outer housing 15 which is held stationary in the vehicle turret by the mounting brackets 21 and 24.

FIGURE 7 illustrates the mirror holder in its normal or central viewing position while FIGURE 6 illustrates the mirror holder 13 in a depressed viewing position and FIGURE 8 illustrates the mirror holder in an elevated viewing position.

In order to prevent entry of foreign particles into the space 90 between the inner housing 16 and the outer housing 15 a molding strip 91 as best shown in FIGURE 4 is provided around the periphery of the viewing slot 30. The molding strip 91 is attached to the outer housing 15 by means of bolts 92. The molding strip 91 has a grooved portion 93 around its inner face which receives a seal ring 94. The seal ring 94 has a portion 95 which sealingly engages the exterior of the inner housing 16 thus preventing foreign matter from entering the space between the inner and outer housings.

In order to allow the mirror housing 13 to function as a part of a weapon sighting system the sight 14 may be mounted in the vehicle turret 10 below the mirror housing 13 and aligned with the viewing slot 32. The gun sight 14 is not integrally attached with the mirror housing 13 and damage to the mirror housing 13 is independent of damage to the optical sighting mechanism 14.

The control or head knob 20 can be attached by a linkage mechanism (not shown) to weapon 12 of the elevating mechanism therefor. The control knob 20 is operatively connected to the extension 71 by means of a gear train 100. The gear train 100 consists in the preferred embodiment of a radial gear 101 fastened to the axle 102 of the control knob 20. The radial gear 101 meshes with a second radial gear 103 on an axle 104. The axles 102 and 104 are freely rotatable in bearings 105 seated respectively in the end cap 18 and cap 107. The radial gear 103 acts as a direction reversing gear and mates with the gear sector 78 which is attached to the extension 71 of the inner housing 16. The gear train housing cap 107 is secured to the end cap 18 by means of dowels 108 and bolts 109. Because of the provision of the reversing radial gear 103 the inner housing will rotate in the same direction as the control knob 20.

FIGURE 11 illustrates a second embodiment of this invention wherein the outer housing 115 is provided by a semi-cylindrical recess in the body 116 of the vehicle turret 10. In this embodiment the vehicle body 116 provides the outer housing 115 and the only opening through the vehicle body is the viewing slot 132 which is equivalent to the viewing slot 32 in a previous embodiment The inner cylinder 16 is the same as described above.

From the above descriptions it will be clear that the horizon or line of sight is changed by rotation of a horizontal cylinder in its housing so that the invention provides a low silhouette mirror useful with independent optical devices and easily linked to an elevatable gun to change the line of sight with the degree of gun elevation.

It will be understood that variations and modifications may be effected without departing from the spirit and scope of the novel concept of this invention.

I claim as my invention:

1. A viewing device unit for use with a separate sighting device and adapted for mounting on the turret of an armored vehicle which provides a low silhouette, which comprises, an elongated horizontal cylindrical housing, means on the housing for mounting said housing to the turret of an armored vehicle or the like, said housing having a pair of viewing slots along the length thereof in circumferentially spaced relation, one of said slots being in the leading face of said cylindrical housing and exposed to the exterior of the vehicle on which the unit is mounted, the other of said slots being in the bottom face of said cylindrical housing and exposed to the interior of the vehicle on which the unit is mounted, said other of said slots adapted to be aligned with a separate sighting device mounted below said unit in the vehicle on which the unit is mounted, an elongated horizontal inner cylinder nestled within, completely surrounded by and rotatably carried in said horizontal cylindrical housing, said inner cylinder having longitudinally extending viewing windows for selective registration with said slots of the cylindrical housing, a mirror fixedly mounted in said inner cylinder along the length thereof in angled relation to said viewing windows of the inner cylinder for reflecting images between the windows, and means for rotating the inner cylinder in the surrounding cylindrical housing to vary the elevation of the view to a sighting device aligned with the other of said slots which is reflected by said mirror.

2. A low silhouette viewing device adapted for independent mounting relative to optical sighting devices in the turret of an armored vehicle or the like which comprises an elongated cylindrical housing, means for fixedly mounting said housing to a vehicle turret or the like, two slots along the length of said housing in spaced circumferential relation, one of said slots being positioned to view a wide angle horizon surrounding the turret or the like to which the housing is mounted, the other of said slots being positioned to transmit the view from said one slot to an independently mounted adjacent sighting device in the turret, a cylinder nestled within, surrounded by and rotatably mounted in said housing having a viewing window along the length thereof for selective registration with said one slot of the housing and a receiving window along the length thereof for selective registration with said other slot of the housing, window panes sealing said windows of the rotatable cylinder, a spring mechanism torsionally loading the rotatable cylinder, a mirror fixed in the rotatable cylinder and extending along the length thereof to reflect images between the windows thereof, and mechanism for rotating the inner cylinder against the load of said spring means to depress and elevate the viewing window of the rotatable cylinder.

3. A low silhouette viewing device which comprises a first horizontal cylindrical housing having a wide first slot along the length thereof providing a horizontal viewing window, a second slot along the length of the bottom of said cylindrical housing narrower than said first slot and spaced circumferentially therefrom, a second cylindrical housing nestled within, surrounded by and rotatable in said first housing having slots along the length thereof adapted to register with said first and second slots of the first cylindrical housing, a mirror in said second housing along the length thereof and mounted fixedly in angled relation to the slots of the second cylindrical housing to reflect images therebetween, means for rotating said second housing in said first housing to vary the position of the mirror and the slots in the second housing for elevating or depressing the field of vision of the mirror and a separate sighting device below the first housing aligned with the second slot to receive the view reflected by said mirror.

4. A viewing device of claim 1 including a gear train adapted to be linked to a gun mechanism coupled to said inner cylinder for elevating and depressing the horizon view of the device in response to the elevation of a gun linked to said gear train.

5. The viewing device of claim 3 including window panes closing the slots of the said second cylindrical housing.

6. The viewing device of claim 5 wherein the second cylindrical housing is sealed and filled with an inert gas to prevent fogging.

7. The viewing device of claim 2 including a gear train linkage to gun elevating mechanism for rotating the inner cylinder as the gun mechanism is elevated or lowered.

8. The device of claim 4 including a torsion spring for applying a load to said inner-cylinder to eliminate backlash in said gear train.

9. The viewing device of claim 3 wherein the inner housing consists of mating halves and the outer housing consists of an open ended cylinder closed by end caps.

10. The viewing device of claim 3 including sealing means surrounding the first slot and engaging the second housing to seal the space therebetween.

11. The viewing device of claim 3 including anti-friction bearings mounting the second housing in the first housing.

References Cited

UNITED STATES PATENTS

| | | | |
|---|---|---|---|
| 1,294,365 | 2/1919 | Bedell | 350—67 |
| 2,360,850 | 10/1944 | Colby | 33—48 |
| 3,262,364 | 7/1966 | Kollmorgen | 350—301 |

DAVID SCHONBERG, Primary Examiner

MICHAEL J. TOKAR, Assistant Examiner

UNITED STATES PATENT OFFICE
CERTIFICATE OF CORRECTION

Patent No. 3,493,296            Dated February 3, 1970

Inventor(s) FRANK ALBERT

It is certified that error appears in the above-identified patent and that said Letters Patent are hereby corrected as shown below:

In the specification:

- Col. 1, line 11: "device mirror device" should be --mirror device--
- Col. 1, lines 19-20: delete "and the inner cylinder has an angled image reflecting mirror therein"
- Col. 1, line 60: "danger" should be --damage--
- Col. 3, line 29: "FGURE" should be --FIGURE--
- Col. 5, line 34: "engaged" should be --engages--
- Col. 6, line 13: "form" should be --from--

In the claims:

- Col. 8, line 6: "horizontal" should be --horizon--

SIGNED AND SEALED

SEP 29 1970

(SEAL)
Attest:

Edward M. Fletcher, Jr.
Attesting Officer

WILLIAM E. SCHUYLER, JR.
Commissioner of Patents